United States Patent [19]

Thompson

[11] Patent Number: 4,671,528
[45] Date of Patent: Jun. 9, 1987

[54] SAFETY HITCH PIN

[76] Inventor: Alva A. Thompson, Rte. 1, Scandia, Kans. 66966

[21] Appl. No.: 772,045

[22] Filed: Sep. 3, 1985

[51] Int. Cl.⁴ .............................................. B60D 1/12
[52] U.S. Cl. ............................. 280/504; 24/230.5 W; 24/230.5 TP; 213/75 R; 213/194; 280/507; 280/515; 411/337; 411/351
[58] Field of Search ............... 280/515, 504, 507, 511; 59/93; 278/96; 411/340, 341, 342, 347, 351, 500, 337; 24/230.5 W, 230.5 TP, 155 R; 294/82; 63/1 R, 1 A, 20; 224/42.03 B, 42.03 R; 278/96, 96.1

[56] References Cited

U.S. PATENT DOCUMENTS

| | | | |
|---|---|---|---|
| 1,072,285 | 9/1913 | Wigley | 294/82.1 |
| 2,000,757 | 5/1935 | Holczer | 411/351 |
| 2,180,558 | 11/1939 | Stastny | 411/342 |
| 2,204,116 | 6/1940 | Blocher | 411/347 |
| 2,514,594 | 7/1950 | Weiler | 280/515 X |
| 2,835,510 | 5/1958 | Schoneberg | 280/504 |
| 2,900,864 | 8/1959 | Chapman et al. | 411/351 |
| 3,865,407 | 2/1975 | Klassen | 280/515 |

Primary Examiner—John J. Love
Assistant Examiner—Mitchell J. Hill
Attorney, Agent, or Firm—Robert E. Breidenthal

[57] ABSTRACT

A safety hitch pin having an enlarged upper end or head that is adapted to rest upon apertured parts secured by the pin. An annular retention device or keeper adapted to receive the lower end of the pin therethrough is provided that has a retainer chain attached. The free end of the chain and enlarged upper end of the pin are provided with parts that are adapted to coact so that a selected portion of the chain can be releasably secured to the upper end or head portion of the hitch pin.

10 Claims, 17 Drawing Figures

SAFETY HITCH PIN

The present invention relates to new and useful improvements in hitch pins and more particularly pertains to hitch pins provided with means for reducing any likelihood of inadvertent dislodgment from its hitching position.

While a hitch pin held in position gravitationally may serve with some degree of reliability over smooth and level terrain or road surfaces under conditions such that the hitch pin is not struck or subjected to substantial vertical accelerations, such does constitute a risk that might well be considered to be of negligent or reckless nature. Indeed, such use of a hitch pin on public ways may be illegal in some jurisdictions, and additionally might serve to void insurance coverage in case of an accident.

In view of the foregoing many prior art proposals have been made with the objective of securing hitch pins against inadvertent development.

Exemplary of prior art proposals, wherein means are provided for detachably connecting the head of a pin to its opposite or lower end portion after insertion of the pin through a clevis and draw bar combination or the like, are the disclosures of the following U.S. Pat. Nos.:

2,180,558, J. Stastny, Nov. 21, 1939,
2,835,510, E. Schoneberg, May 20, 1958,
2,900,864, H. W. Chapman et al, Aug. 25, 1959,
2,204,116, C. M. Blocher, June 11, 1940,
2,000,757, M. Holczer, May 7, 1935,
2,514,594, R. C. Weiler, July 11, 1950,
3,865,407, James G. Klassen, Feb. 11, 1975.

Each of the above proposals appear to require the opposite or lower end of the pin to be apertured or otherwise machined or reduced in size to depart from a simple cylindrical configuration and some entail the inconvenience of completing the hitch or iniating release of the hitch pin at a position below the clevis or coupling. Such an inconvenience is feared to be conducive to the user being lax and omitting the use of the protective provision.

Other proposals for avoiding inadvertent hinge pin dislodgment are disclosed in the following U.S. Pat. Nos.:

2,158,941, H. Landis, May 16, 1939,
2,705,157, D. D. Dail, Mar. 29, 1955,
3,169,784, J. H. Lorimor, Feb. 16, 1965.

The paramount objective is to provide a hitch pin with means for selectively preventing inadvertent removal of the pin from its operative position, with such means being selectable by a manual act conveniently performable at the head or upper end of the hinge pin.

A closely related object is that the means be especially secure against damage by the environment of the lower end of the pin during use.

Another object is to provide a means such as indicated above which is compatible with conventional hinge pins modified only to the extent of the enlarged upper end portion of the pin being provided with a transverse opening therethrough.

Other objects and advantages of the invention will become apparent during the following description of preferred embodiments of the invention given in conjunction with the accompanying drawings illustrative thereof, wherein.

Figure 1:
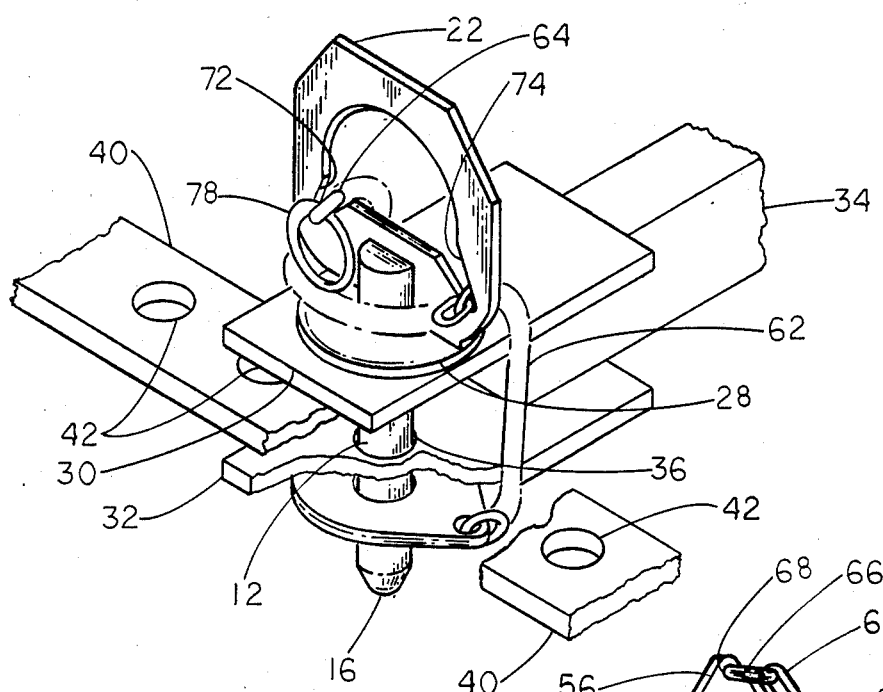
FIG. 1 is an isometric illustration of the hinge pin and the securing means in operative condition hitching a tongue and clevis combination to a draw bar, with the combination and draw bar being fragmentarily shown, and with extents of the tether chain of the securing means being shown in dashed outline.

Referring now to the drawings wherein like numerals designate like views throughout the various views with attention being first directed to the form of the invention shown in FIGS. 1-6, the numeral 10 designates the hinge pin generally, the same being constituted of an elongated steel pin or shank 12 and a steel head portion 14 welded to the upper end of the pin 12.

The pin is of an elongated circular cylindrical configuration and terminates at its lower end in a blunted, frusto-conical end portion 16.

The head portion 14 comprises a flat washer or ring 18 having a central circular opening 20 therethrough of a diameter that will accommodate the upper end of the pin 12 therethrough. A flat steel head plate 22 is fixed to the washer 18 by welding or the like, with such plate being perpendicular to the washer and coincident with the axis of the opening 20. As shown, the plate 22 is of substantially less thickness than the diameter of the opening, and has a recess 24 in the center of its lower edge of a width equal to the diameter of the opening 20, whereby the upper end portion of the pin 12 can extend upwardly through the opening and be seated in the recess 24.

Figure 2:
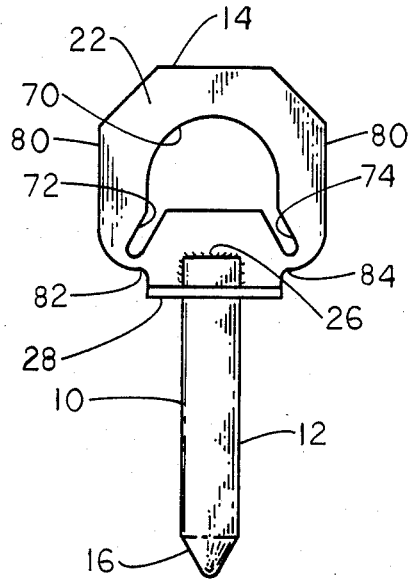
Figure 3:
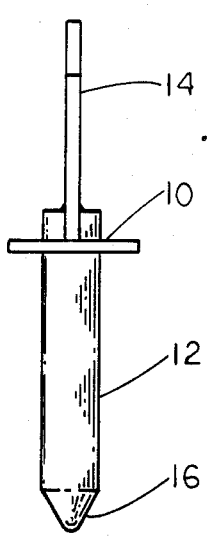
Figure 5:
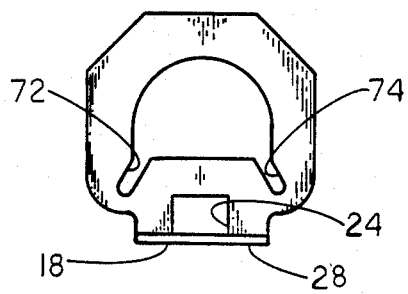
FIG. 5 is a front view of the head portion of the hinge pin apart from and prior to its welding to the stem or shank to obtain the assembled hitch pin shown in FIGS. 1-4.
Figure 9:
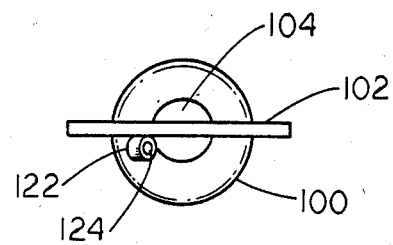
FIG. 9 is a top view of the structure shown in FIG. 7, with the securing means being omitted.
Figure 10:
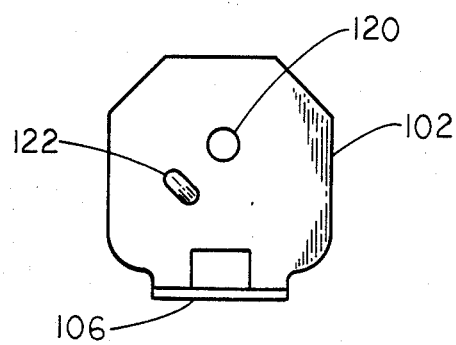
FIG. 10 is a front view of the head portion of the hitch pin shown in FIGS. 7, 8 and 9, and illustrates the same prior to welding to a pin to constitute a complete hinge pin.
Figure 11:
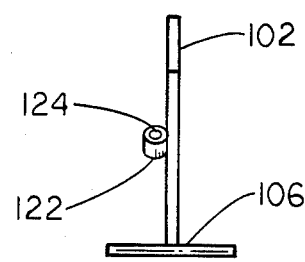
FIG. 11 is a side view of the structure shown in FIG. 10.

With the pin 12 seated as described above, the hinge pin 10 is formed as an integral item upon welding the pin 12 to the washer 18 about the inner periphery of the opening 20 and to the plate 22 about the edges of the recess 24 as shown best in FIG. 2 at 26. With the head portion 14 assembled and fixedly secured to the pin 12, it will be noted that the lower face of the washer 18 constitutes a downwardly facing horizontal shoulder 28 that is normal to the vertical axis of the pin 12.

As shown in FIG. 1, the pin 12 is adapted to pass downwardly through aligned apertures in the spaced upper and lower elements 30 and 32 of a clevis structure fixedly secured to and projecting forwardly of a tongue partially shown at 34. The aperture in the partially shown clevis element 32 is visible in FIG. 1 and is designated by the reference numeral 36. A draw bar is partially shown at 40 and is conventionally provided with spaced apertures 42 therethrough. Also, as is conventional, the draw bar 40 is received between the clevis elements 30 and 32 with one of its apertures 42 in alignment with apertures (such as the aperture 36) with the pin 12 extending through the three aligned apertures to complete the hitching of the tongue 34 to the draw bar 40; it being understood that the tongue is conventionally attached to towed apparatus, not shown, and that the draw bar 40 is conventionally attached to a towing vehicle such as a tractor, not shown.

When the hitch pin 10 is in its operative position shown in FIG. 1, it will be noted that the shoulder 28 rests upon and seats against the upper surface of the clevis element 30, with the pin 12 being retained in its hitching position gravitationally by the weight of the hitch pin 10. All too often reliance is solely made upon gravitational retention of a hitch pin, but such is unsafe and is especially unreliable when the hitch is in such use over uneven ground and/or at excessive towing speeds. For example, merely passing over a sharp hump coupled with coincident relaxation of towing tension can, on pin contact with the pump, eject the pin from its hitching position with possibly disastrous consequences. As indicated previously, the basic purpose of this invention is to provide means that will positively prevent inadvertent ejection or working loose of a hitch pin from its hitching position, with such means being not only highly reliable but also easy and convenient to use as well as being well exposed for visual inspection. Such means will now be described.

Figure 6:
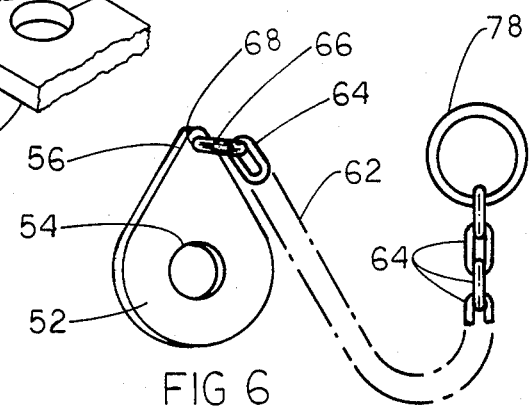
FIG. 6 is an isometric view of the securing means shown in FIG. 1, with an intermediate extent of the tether chain being shown in dashed outline.
Figure 4:
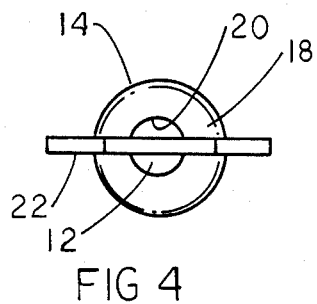
FIGS. 2, 3 and 4 are respectively front, side and top views of the hinge pin with the securing means being omitted.

An annular retainer device or keeper 50 is provided in the preferred form best shown in FIG. 6 of a flat steel plate having an overall "teardrop" configuration. The keeper 50 may be viewed as a circular steel washer portion 52 having an aperture 54, and with the washer having a projecting and tapered integral flange portion 56. The aperture 54 is of a diameter to receive the pin 12 therethrough with a loose sliding fit.

A keeper 50 has one end of an elongated and flexible tether 60 fixed thereto, such tether preferably taking the form of a steel chain 62 of interlocking steel links or loops 64. A closed end loop 66 of the chain 62 is constructed to pass through an aperture 68 in the keeper flange 56 to securely attach the chain 62 to the keeper 50. In practice the chain loop 66 can be cut, spread and passed through the aperture 68, after which the loop 66 is closed and welded at the cut to assure a strong and secure connection.

In each of the varient forms of the invention, means are provided to releasably attach a selected part of the tether 60 along its length to the head portion of the hinge pin.

In the form of the invention now being described, the head plate is provided with an enlarged opening that is peripherally bounded along its lower edge by a pair of spaced and downwardly directed slots or recesses 72 and 74. As clearly shown in FIG. 2, the opening 70 is much greater in size than the transverse dimensions of the chain 60, and that the opening 70 has downwardly inclined communication with the recess or slots 72 and 74. The recesses 72 and 74 are similarly dimensioned to each other and each has a depth approximating and preferably a bit larger than the maximum transverse dimensions of the chain loops. The recesses or slots have widths intermediate the maximum and minimum transverse dimensions of the chain loops 64 and preferably only a bit greater than the minimum transverse dimension of the chain loops 64. The arrangement is such that any selected loop 64 of the chain 62 can be inserted laterally into one of the slots 72 and 74, with endwise movement of the chain 62 through the plate 22 be prevented by the loops 64 adjacent thereto jamming against the plate 22, it being noted that adjacent loops lie in substantially mutually perpendicular planes in the immediate vicinity of their interlocking engagement.

The chain 62 can be optionally provided with a ring 78 fixed thereto at the end remote from the keeper 50.

The head plate 22 is preferably of about the same lateral extent as the washer 18 at and for a short interval thereabove of about the maximum transverse extent of the chain, and thence is laterally enlarged thereabove as at 80 to define downwardly facing shoulders 82 and 84. The configuration of the upper part of the head plate 22 is largely a matter of choice and can conveniently be as shown.

The use of the form of the invention shown in FIGS. 1-6 will be readily appreciated. With the hinge pin 10 positioned as shown in FIG. 1, the keeper 50 is passed upwardly about the lower end of the pin 12, and it will be noted that such can be easily done just by feel and without visual inspection by reason of the simple character of the keeper 50 and the tapered end 16 of the pin 12.

After the keeper 50 has been positioned to immediately underlie the clevis element 32, the chain 62 is passsed upwardly about the draw bar 40 (usually to the rear thereof) and thence passed through the opening 70 and after pulling the chain taut, a link or loop 64 of the chain 62 is inserted edgewise into the slot 74, and the remaining feee extent of the chain 62 is extended about the head portion 14 and after passing under the shoulder 82, it is passed taut through the opening 70 in the same direction as the chain 62 was initially passed and a link or loop 64 is inserted into the slot or recess 72. The last mentioned loop 64 may, as shown, be the link immediately adjacent the ring 78 in which event the latter serves the blocking function as will be readily understood, or any link 64 that may be necessary to obtain desired tautness can be placed in the slot 72. The free end of the chain 62 (the ring 78 in the illustrated case) is then allowed to hang freely from the slot 72 and thereby gravitationally retain the chain in the slot 72.

The safety means described above can be easily inspected from above with no stopping or bending over being required, and will retain the hitch pin 10 secure until desired. Unhitching is even simpler. The chain 62 is released by removal from the slots 72 and 74 and pulled free of the opening 70, after which mere slacking the chain 62 allows the keeper to fall free of the pin 12. The hitch pin 10 can then be withdrawn, with the entire procedure of unhitching only requiring the user to reach down to the level of the head portion 14 of the hitch pin 10.

It will be noted that the gravitational retention of the chain in the slots 72 and 74 will not be disturbed by ground humps or vegetation clumps or clusters as the slots 72 and 74 are directly above the clevis structure.

Passing now to the form of the invention shown in FIGS. 7-12, the hitch pin 100 is quite similar to the hitch pin 10 and essentially differs solely as to structure of its head plate 102. Briefly, the hitch pin 100 includes a pin 104 fixedly secured to a head portion 106 in essentially the same manner as the securance of the pin 12 to the head portion 14. The pin 104 is identical to the pin 12. The head portion 102 includes an annular downwardly facing shoulder 106 identical to the shoulder 28 previously described.

A keeper 110 and chain 112 are provided that correspond to the previously described keeper 50 and chain 62, with the chain including links or loops 114 like the previously described links or loops 64.

The head plate 102 is unlike head plate 22 in that it does not include an opening 70 or slots 72 and 74.

The head plate 102 is provided with an aperture 120 of sufficient size that a portion of any of the chain links 64 can be inserted thereinto to project from the other side of the plate 102, and a rib or boss 122 is fixed to such other side of the plate 102, with said boss 122 having an opening 124 therethrough that opens spaced from and parallel to the plate 102 in the direction of the aperture 120.

The use of the modification shown in FIGS. 7-12 will now be readily understood.

Figure 7:
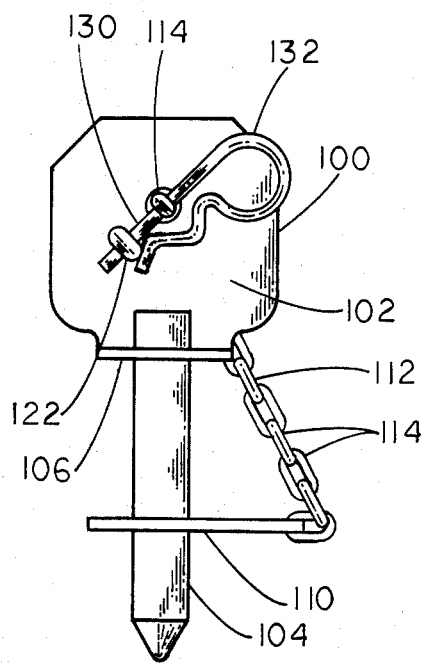
FIG. 7 is similar to FIG. 1 (tongue and draw bar being omitted), and illustrates a modified form of the hitch pin in association with the securing means shown in FIGS. 1 and 6.
Figure 8:
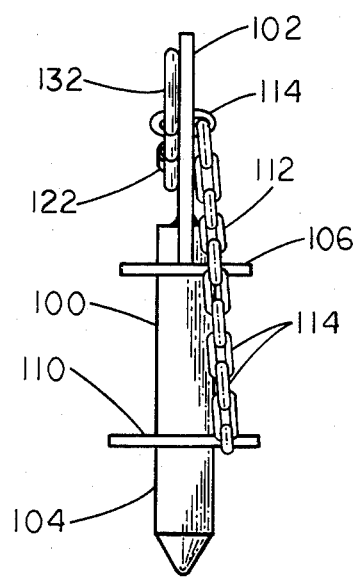
FIG. 8 is a side view of the structure shown in FIG. 7.
Figure 12:
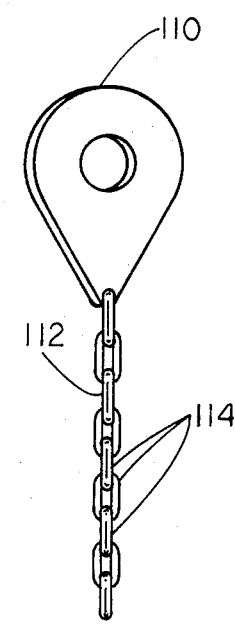
FIG. 12 is a fragmentary showing of the securing means shown in FIGS. 7 and 8.

With the pin 104 disposed in its operative hitching position, the keeper 110 is disposed about and raised to its limiting position (such as the keeper 50 in FIG. 1), and the chain is made taut and the link 114 nearest the aperture 120 inserted into the latter from the side of the plate 102 opposite the boss 122, and the straight leg 130 of a conventional resilient-hairpin-type retainer or clip designated generally at 132 is passed through both the inserted loop (on the side of the plate 102 as the boss 122) and through the opening 124 in the boss 122 as shown in FIGS. 7 and 8.

The retainer or clip 132 will reliably secure the hitch pin 100 in its hitching condition as long as desired. Release is conveniently obtained on simply removing the spring clip 132.

Here again the clip 132 is secure against inadvertent dislodgment by ground humps, rocks or vegitation by reason of being directly above a clevis or the like during use.

Attention is now directed to the form of the invention shown in FIGS. 13-17. This form of the hitch pin assembly is designated generally at 200 and comprises a conventional hitch pin 202 modified only to the extent hereinafter expressly noted. The hitch pin 202 comprises a steel pin 204 generally similar to the pin 12. An enlarged head 210 is integral with the upper end of the pin 204 and defines a downwardly facing annular shoulder 212 that serves the same function as the previously described shoulder 28. An extant and conventional hitch pin involves the optional provision of a handle or bail 214 pivotally mounted on the upper end of the head portion 210 and extends into or through a transverse opening 216 in the latter. As thus far described, the hitch pin 202 is entirely conventional, and the structure thus far described is only modified according to this invention solely by the provision of a transverse opening 220 through the head portion 210.

If the optional bail 214 is provided, the opening 220 is preferably disposed at right angles to the opening 216 as shown.

It will be understood by those skilled in the art that virtually any conventional hitch pin having an enlarged head portion can be modified in accordance with this invention by the provision of a transverse opening in the head portion. Indeed, extant hitch pins having a transverse opening may require no modification whatever for use in the form of the invention now being described.

A steel chain 230 having links or loops 232 is provided that is generally similar to the previously described chain 62 and links 114. A keeper 234 generally similar to the keeper 50 is fixed securely to one end link of the chain 230 as shown.

The chain 230 is extended through transverse opening 220, it being noted that the latter is of sufficient size to allow the chain to freely slide therethrough.

A convoluted hook structure designated generally at 240 is provided, and such hook structure 240 has a closed eye 242 at one end that is interlocked with the link 232 of the chain 230 most remote from the keeper 234 as shown.

Inasmuch as the keeper 234 and the hook structure 240 are both so very much larger than the transverse opening 220, it will be immediately manifest that the chain 230, the keeper 234, and the hitch pin 202 are all held together so that a special advantage of this particular form of the invention is that such components cannot stray from one another.

Figures 16, 17:
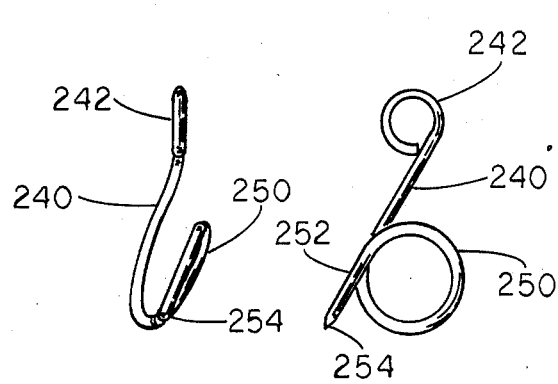

The convoluted hook 240 is so termed for the reason that the stiff steel wire of which it is formed terminates at its end remote from the eye 242 in a full open turn 250 of somewhat a spiral configuration shown best in FIGS. 16 and 17. Ordinarily a hook is defined by one-half turn or less, whereas the hook of the invention has more than one-half turn of spiral or helical configuration provided for a reason that will become quite clear. Accordingly, the hook has a helical or spiral configuration of more than 180° extent. The preferred full turn portion 250 of spiral or helical configuration terminates in a substantially straight portion 252 that extends from the turn 250 in a direction generally opposite the direction of the eye 242 and ends in a tip 254. Accordingly, the hook of this invention preferably has a turn of at least 300° of spiral or helical configuration.

Figure 13:
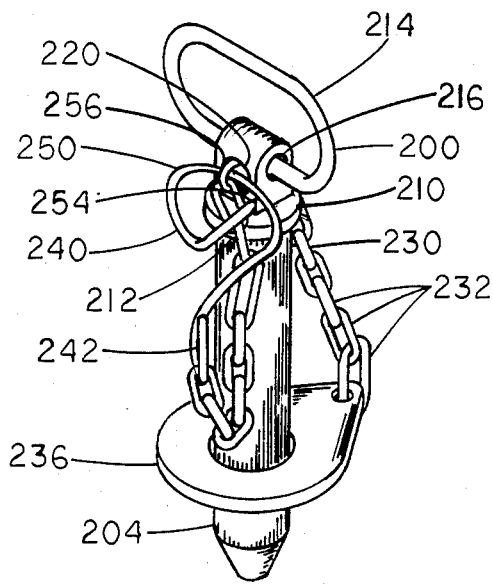
FIG. 13 is an isometric view of yet another modification of the hitch pin and of the securing means, and shows them in operative relationship to each other with the tongue and draw bar being omitted.
Figure 14:
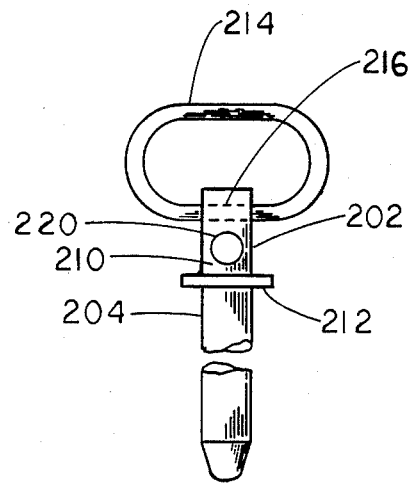
FIG. 14 is a front view of the modified hitch pin shown in FIG. 13.
Figure 15:
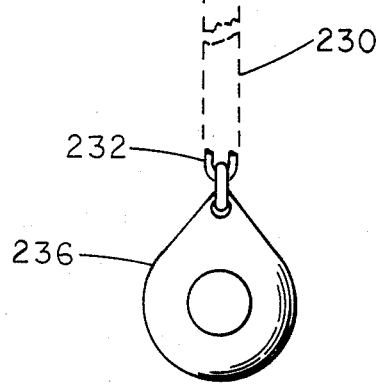
FIG. 15 is a fragmentary showing of the securing means of FIG. 13 with an annular retainer fixed to one inch of the tether and a convoluted hook fixed to the other end; and, FIGS. 16 and 17 are respectively enlarged side and front views of the convoluted hook.

In use the keeper 234 is raised to its limiting position and the chain 230 is made taut through the opening 220. The free end 254 of the hook 240 is passed through the chain link or loop 256 last emerging through the aperture 220 from the keeper 234, and at least one half of the full turn 250 is passed through the chain loop 232 so that the hook 240 and the chain 230 will be suspended as best shown in FIG. 13. Manifestly, the engagement of the hook 240 with the loop 254 is such that inadvertent disengagement is essentially impossible with deliberate manual manipulation being required to effect disengagement. Until such essential manual manipulation is effected the hitch pin assembly 200 will remain secure. Such manual manipulation and release can be easily accomplished and unhitching efficaciously effected.

As is the previously described embodiments, the key to release (here the hook 240 engagement) is disposed in an essentially sheltered position above the clevis or the like.

While each of the chains has been illustrated as constituted of interlocked welded steel links wherein each link is elongated and of a planar configuration. It will be manifest to those modestly conversant that other forms of chains can be employed other than the form illustrated. Since the chains do not form the subject matter of this invention per se, it will suffice by way of example to indicate that a suitable alternate form of chain is such that each elongated closed loop is twisted about its longitudinal axis intermediate its ends about 90°. Clearly, chain links are not necessarily formed of closed loops or involve any welding as many forms of suitable chain use links of individual lengths of formed wire.

Having now fully described the invention as to its structure and modes of use, attention is now directed to the appended claims to ascertain the actual scope of the invention.

I claim:

1. A hitch pin of the type including an elongated vertical pin of a circular cylindrical configuration that is adapted to extend downwardly through aligned openings of a hitch with the pin having a radially enlarged head at its upper end that presents a downwardly facing shoulder adapted to rest upon the top of the hitch in combination with an improved means for releasably retaining the hitch pin in a hitching mode, said improved means comprising an elongated flexible tether having a keeper fixed to one end thereof, said keeper comprising a body having an opening therethrough that slidably receives a lower portion of the pin therethrough for adjustment of said keeper on said pin, and securing means for releasably securing a selected portion of the tether that is remote from the keeper to the head against any tension in the tether between such selected tether portion and the adjustable keeper.

2. The combination of claim 1, wherein the head has a horizontal aperture therethrough with the tether extending through said aperture with free running clearance, with said securing means including a blocking member fixed to the end of the tether remote from the keeper, both said keeper and the blocking member being larger than the aperture to prevent withdrawal of the tether through the aperture, with the securing means including the blocking member and the tether having coacting means for engaging the former with the selected portion of the latter.

3. The combination of claim 2, wherein the tether is a chain comprised of a series of links, with the coating means comprising each link defining a hook receiving opening, and said blocking member including a hook that may be selectively engaged with any one of the chain links by extending through the hook receiving opening thereof.

4. The combination of claim 3, wherein the hook includes an arcuate portion of more than 180° extent.

5. The combination of claim 3, wherein the hook is of helical configuration and is of at least 300° extent.

6. The combination of claim 3, wherein the hook is a convoluted turn and terminates in a portion directed from the connection of the hook to the tether.

7. The combination of claim 1, wherein the tether is a chain of interconnecting links, and wherein the head includes a vertical flat plate of a thickness less than the longitudinal extent of each of the chain links, said plate having an opening therethrough of a size accommodating at least free running clearance of the chain therethrough, with a portion of plate bounding the opening being provided with a slot that opens upwardly to the opening in the plate, said slot having a width intermediate the minimum and maximum transverse dimensions of each chain link, whereby a selected link of the chain may be received edgewise in the slot so that immediately adjacent chain links prevent endwise movement of the chain through the slot.

8. The combination of claim 7, wherein the opening in the plate is several times greater than the maximum transverse dimension of the chain and wherein the plate is provided with second slot spaced from and corresponding to the first mentioned slot, whereby selected spaced links of the chain can be positioned in the slots, with the extent of the chain intermediate the selected links disposed about plate externally of the opening in the latter.

9. The combination of claim 1, wherein the tether is a chain of interconnected links, with each link defining an opening transversely therethrough, said enlarged head including a plate having a thickness less than the longitudinal extent of each link, said plate having an aperture therethrough of sufficient size to accommodate at least partial extension of a link therethrough from one side of the plate, and said securing means including an elongated retainer having a length substantially greater than the size of the aperture in the plate and being disposed on the side of the plate opposite said one side and removably received through the opening in a link extending through the aperture for preventing withdrawal of the link from the aperture toward said one side.

10. The combination of claim 9, including means for defining an eye on the opposite side of the plate that opens parallel to the plate in the direction of the aperture, and said elongated retainer being of a resilient hairpin configuration inclusive of a straight leg and a sinuous leg, with said straight leg removably extending through both the link and the eye in an arrangement such that the sinuous leg in repose is disposed to oppose removal of the straight leg.

* * * * *